Oct. 13, 1964    D. GOLDSTEIN    3,152,687
COMBINATION SHIPPING CONTAINER AND DISPLAY DEVICE
Original Filed Oct. 13, 1959    4 Sheets-Sheet 1

INVENTOR.
Daniel Goldstein
BY Blum, Moscovitz,
Friedman and Blum

ATTORNEYS

Oct. 13, 1964  D. GOLDSTEIN  3,152,687
COMBINATION SHIPPING CONTAINER AND DISPLAY DEVICE
Original Filed Oct. 13, 1959  4 Sheets-Sheet 2
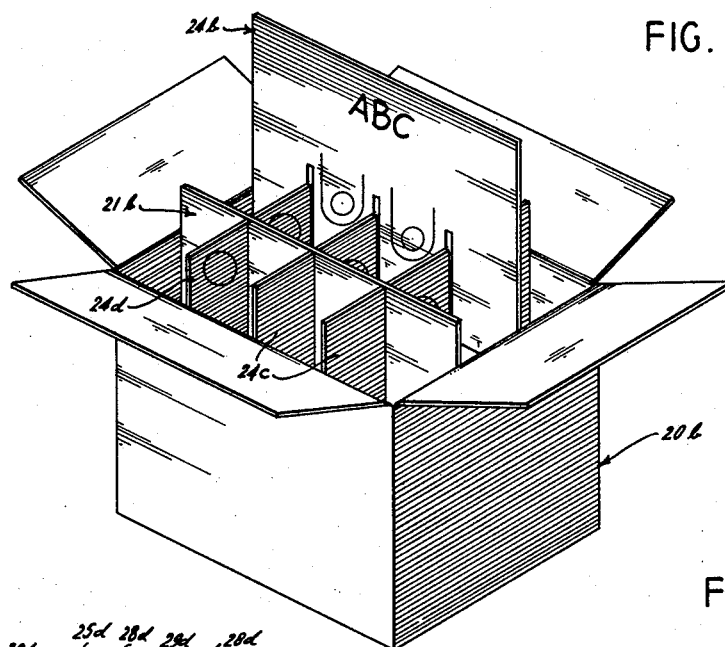
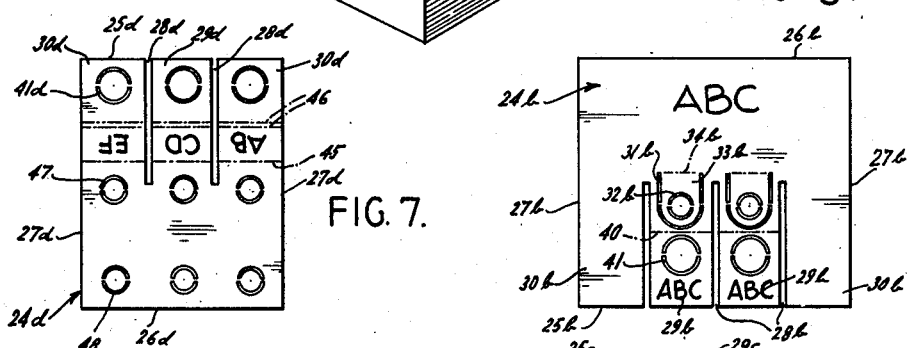
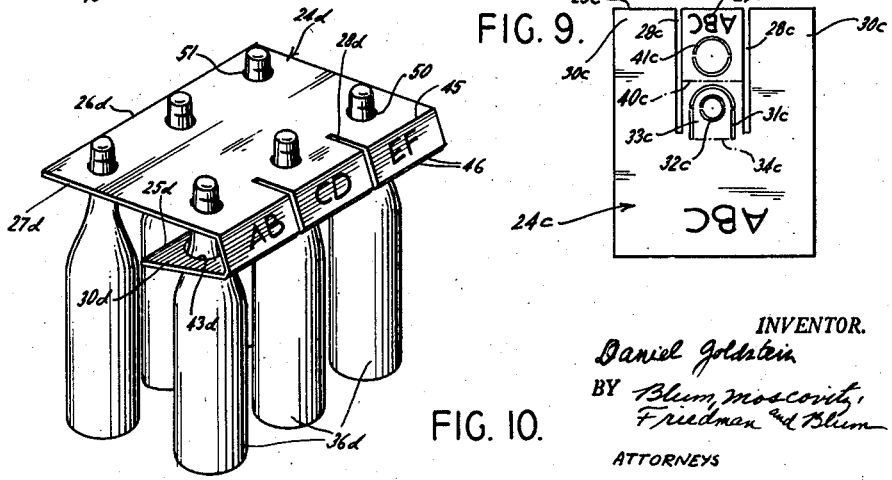
INVENTOR.
Daniel Goldstein
BY Blum, Moscovitz,
Friedman and Blum
ATTORNEYS Oct. 13, 1964  D. GOLDSTEIN  3,152,687
COMBINATION SHIPPING CONTAINER AND DISPLAY DEVICE
Original Filed Oct. 13, 1959  4 Sheets-Sheet 3

INVENTOR.
Daniel Goldstein
BY Blum, Moscovitz,
Friedman & Blum
ATTORNEYS

Oct. 13, 1964 D. GOLDSTEIN 3,152,687
COMBINATION SHIPPING CONTAINER AND DISPLAY DEVICE
Original Filed Oct. 13, 1959 4 Sheets-Sheet 4

INVENTOR.
Daniel Goldstein
BY Blum, Moscovitz,
Friedman and Blum

ATTORNEYS

United States Patent Office 3,152,687
Patented Oct. 13, 1964

3,152,687
COMBINATION SHIPPING CONTAINER AND
DISPLAY DEVICE
Daniel Goldstein, New York, N.Y., assignor to Schenley
Industries, Inc., New York, N.Y., a corporation of
Delaware
Original application Oct. 13, 1959, Ser. No. 849,827.
Divided and this application Aug. 21, 1962, Ser. No.
218,309
3 Claims. (Cl. 206—44)

This invention relates generally to a combination shipping container and display device, and is especially concerned with novel self-forming and self-standing easels for presenting an attractive advertising message and effectively preventing pilferage and theft. This is an improvement over the type of combination container and display device shown and described in application Serial No. 523,301, filed July 20, 1955. This is a division of application Serial No. 849,827 filed by me on October 13, 1959.

While the present invention has been primarily developed and employed for use in conjunction with transporting and displaying bottles, and will be illustrated and described hereinafter with particular reference thereto, it is appreciated that the various novel devices of the instant invention are capable of many varied applications, all of which are intended to be comprehended herein. For example, the combination shipping container and display device may be in conjunction with bottled goods as well as goods in tubes, cans, boxes and jars, and for all sizes thereof.

It is a general object of the present invention to provide a combination shipping container and display device which is adapted for advantageous employment in attractively displaying the contents of the shipping container, presenting advertising material in connection with the displayed merchandise at the point of sale, and in substantially eliminating or reducing theft of the goods displayed.

It is another object of the present invention to provide a combination device of the type described wherein the separator or divider panels, protecting pads, and liner sections may be utilized for advertising and display purposes without sacrifice of their protective functions in transit.

It is a further object of the present invention to provide a combination container and display structure having the advantageous characteristics mentioned in the preceding paragraphs which may very quickly and easily be transformed from its original condition to accomplish the merchandise display and advertising function, even by unskilled persons and with little or no instructions.

The instant invention further contemplates the provision of display material for association with merchandise in such a manner as to deter and inhibit pilferage or stealing of the merchandise.

It is still another object of the invention to provide a combination device of the type described wherein a display may be formed from the container, as by punching out and tearing, all without the use of a knife or any other cutting instrument.

It is still another object of the present invention to provide a combination shipping container and display device of the type described which includes one or more panels of novel structure such as to be readily formed into an easel or sign associated with the contained goods and adapted to carry a related advertising message.

Other objects of the present invention will become apparent upon reading the following specification and referring to the accompanying drawings, which form a material part of this disclosure.

The invention accordingly consists in the features of construction, combinations of elements, and arrangements of parts, which will be exemplified in the construction hereinafter described, and of which the scope will be indicated by the appended claims.

In the drawings:

FIG. 6 is a top perspective view showing an open container including a cell structure of dividers or separators of one size and type constructed in accordance with the teachings of the present invention;

FIG. 7 is a plan view showing a divider of the cell structure of FIG. 6 apart therefrom;

FIG. 8 is a plan view showing another divider element of the cell structure of FIG. 6 apart therefrom;

FIG. 9 is a plan view showing a slightly modified divider of the present invention;

FIG. 10 is a top perspective view illustrating the divider of FIG. 7 as an easel in its operative merchandise-displaying condition;

While the presently preferred material of the hereinafter described container and cell structure is that of corrugated cardboard, it is understood that any suitable material may be employed, as desired, without departing from the spirit and scope of the present invention.

Figure 1:
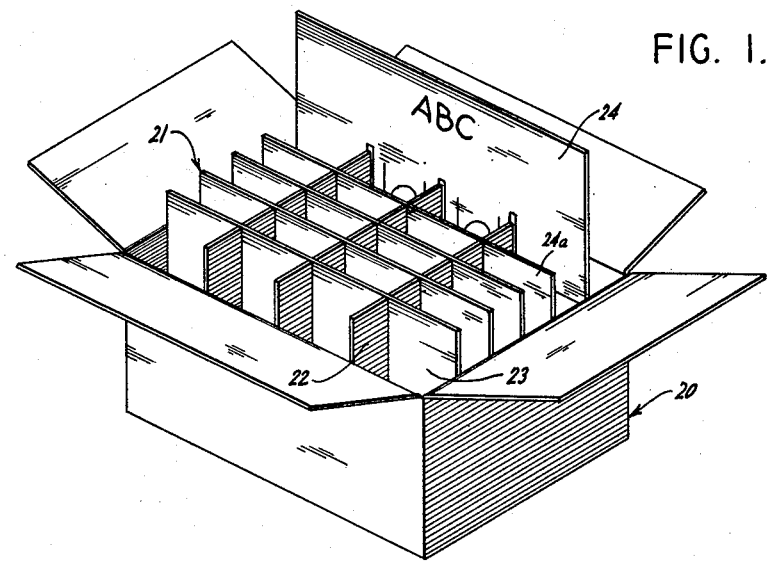
FIG. 1 is a top perspective view showing an open shipping container and a cell structure therein including a divider or separator panel constructed in accordance with the teachings of the present invention.
Figure 3:
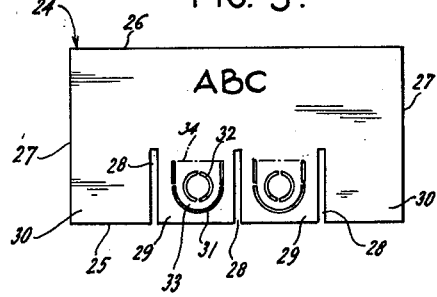
FIG. 3 is a plan view showing a slightly modified divider panel constructed in accordance with the present invention.
Figure 5:
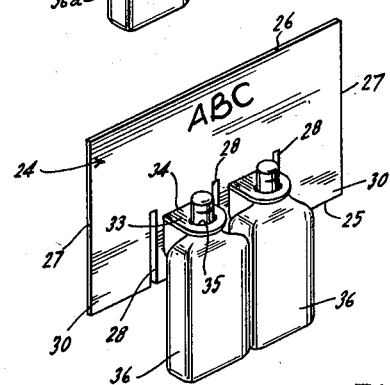
FIG. 5 is a perspective view showing the divider of FIG. 3 in its easel or display condition.

Referring now more particularly to the drawings, and specifically to FIGS. 1, 3 and 5 thereof, an open box or container is shown in FIG. 1, and there generally designated 20. Interiorly of the container 20, and partially removed therefrom, is a cell structure, generally designated 21, which may include a plurality of intersecting dividers or separators 22, 23 and 24. Certain of the dividers extend in one direction in parallel spaced relation with respect to each other, while the remaining dividers extend in a transverse direction in parallel spaced relation with respect to each other and intersecting the first-mentioned dividers to define a plurality of cells or enclosed spaces serving to protectively receive articles of merchandise during shipment. The dividers may be suitably slit or slotted for interfitting engagement in the well-known manner.

A particular divider or separator 24 has been arbitrarily selected to be shown for purposes of illustration in FIGS. 3 and 5. The divider 24 may be a generally rectangular, substantially coplanar panel having generally horizontal, parallel lower and upper edges 25 and 26, respectively, and generally vertical side edges 27 extending between the lower and upper edges. A plurality of slots 28 are formed extending inward or upward from the lower panel edge 25 and terminating short of or spaced from the upper panel edge 26. As illustrated, the slots 28 extend in substantial parallelism with each other and with the side panel edges 27, being equally spaced apart from next adjacent slots and the side edges. Thus, the lower part of the panel 24 is subdivided into generally rectangular regions of equal area, as at 29 each located between an adjacent pair of slots 28, and as at 30, each located between a laterally outer slot 28 and the adjacent panel side edge 27. The upper part of the panel 24 may provide a continuous area for the imprinting of advertising material, as demonstrated by the characters "ABC."

Formed in each of the lower panel regions 29 may be a generally U-shaped severance line, interrupted, cut, or otherwise weakened region, as at 31, having its bight portion lowermost adjacent to and spaced from the lower panel edge 25, and having its legs extending generally upward toward the panel edge 26. Located in spaced relation within the U-shaped interrupted cut 31 is an interrupted cut or weakened line 32, which may be of circular or other closed configuration.

Upon severance of the weakened line 31, the panel area therewithin, designated 33 may be swung out of the plane of the panel, as about a fold line, score, or crease, extending generally horizontally between the free, upper ends of the U-shaped cut 31. In this condition, see FIG. 5, the panel area 33 defines a tab or flap extending away from the panel at the fold line or crease 34 and disposed substantially horizontal or normal to the panel. The region bounded within the circular cut 32, see FIG. 3, may be readily removed to define a through opening or aperture 35 in the flap 33. The aperture 35 in each flap 33 is of a size adapted to receive the neck of a bottle 36, see FIG. 5, but insufficient to pass beyond the bottle neck, so that the tab 33 engages with and rests on the enlarged portion or shoulder of the associated bottle.

It will now be appreciated that the apertured tabs or flaps 33 in their forwardly extending, horizontally disposed relation of FIG. 5, serve to mount the divider panel 24 in generally upstanding relation on the bottles 36 for attractively displaying the latter and visually presenting to observers the desired advertising material in conjunction with the merchandise. In order to assure the substantial vertical disposition of the panel 24 in its displaying condition of FIG. 5, the flap apertures or openings 35 are located in spaced relation with respect to the ends of the cut 31 and the score or fold line extending therebetween, such that the lower portion of the panel region 29, beneath the flap, engages or bears against the supporting bottle 36 when the panel is generally vertical. Thus, panel movement out of vertical disposition is effectively restrained by this bearing engagement of the lower panel region, and by the resistance of fold line 34 to additional creasing.

It is, of course appreciated that an opening is formed in the divider panel 24 upon swinging of the flap 33 to its position normal to the divider panel. That is, the panel region previously occupied by the flap 33 is open. If desired, the opposite face of the divider panel 24 (the rearward face as seen in FIG. 5) may be provided with a desired advertising message, and the bottles 36, or portions thereof, presented to view through the panel openings formed by outward swinging movement of the flaps 33.

Figure 4:
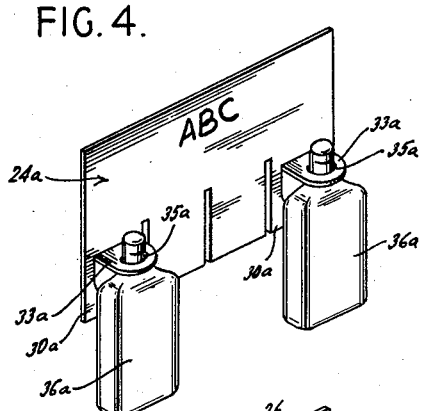
FIG. 4 is a perspective view illustrating the divider panel of FIG. 2 as an easel in its merchandise-displaying condition.
Figure 2:
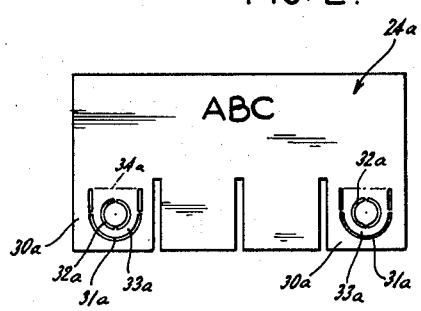
FIG. 2 is a plan view of the panel of FIG. 1 removed from the assembly thereof.

In the embodiment of FIGS. 2 and 4, there is shown a divider panel 24a which is similar to the divider panel 24, except that the U-shaped cuts or lines of weakening 31a, and the circular cuts or lines of weakening 32a are located in the laterally outermost lower panel regions 30a, rather than in the laterally inner or medial regions 29 as in FIG. 3.

The interrupted cuts or weakened lines 31a are severable to define tabs or flaps 33a, as seen in FIG. 4, extending horizontally forward from the panel and located adjacent to opposite side edges thereof. Severance of the circular cuts 32a, of course, provides through openings or apertures 35a in the flaps 33a for receiving the necks of bottles 36a in the same manner as the first-described embodiment. Of course, additional modifications of the first-described embodiment may be employed to those skilled in the art to satisfy different conditions and requirements.

In the embodiment of FIGS. 6 and 8 is shown a shipping container, generally designated 20b having a cell structure 21b partially removed therefrom, including a divider or separator 24b.

The divider 24b is best seen in FIG. 8 as a generally rectangular, substantially coplanar panel having horizontal lower and upper edges 25b and 26b, and generally vertical side edges 27b extending between the lower and upper edges. A plurality of generally parallel slots 28b extend inward or upward from the lower panel edge 25b toward and stop short of or spaced from the upper panel edge 26b. The slots 28b are preferably equally spaced from each other and the side panel edges 27b to define a plurality of equal-area lower panel regions 29b between adjacent slots, and 30b between each side edge 27b and the adjacent slot 28b.

Formed in each lower panel region 29b is a generally U-shaped cut or line of weakening 31b, which has its lower, bight portion substantially spaced from the lower panel edge 25b, and has the free ends of its legs extending upwardly, slightly beyond the slots 28b. A generally horizontal fold line or score 34b may be formed extending between the free ends of each U-shaped cut 31b. Within each U-shaped cut 31b is provided a generally circular cut or line of weakening 32b. The cuts 31b and 32b, of course, correspond to the cuts 31 and 32 described hereinbefore, as do all correspondingly numbered elements of the several modifications.

Further, divider panel 24b is formed in each of its lower regions 29b below the U-shaped cut 31b with a generally horizontal fold line or crease 40 extending to and terminating at the adjacent slots 28b. Viewed otherwise, the aligned fold lines or scores 40 may be considered as a single fold line or score extending laterally or horizontally between the outer slots 28b and intersecting the medial slot 28b. In the lower portion of each region 29b, between the fold line 40 and lower edge 28b, there is formed an additional circular cut or weakened line 41.

Figure 11:
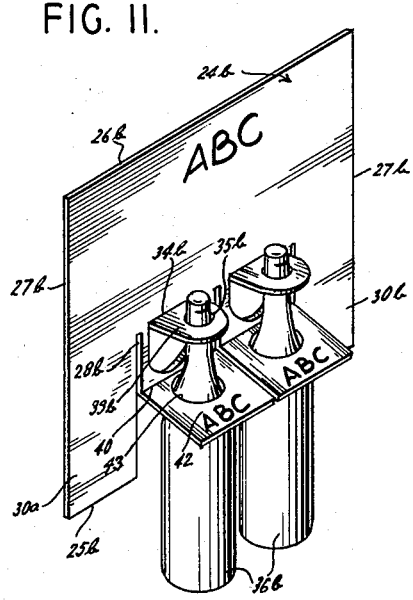
FIG. 11 is a perspective view illustrating the divider of FIG. 8 as an easel in its display condition.

The operational employment of divider panel 24b as a display in conjunction with the merchandise is illustrated in FIG. 11. It is there seen that the U-shaped cuts 31b have been severed and the panel material therewithin swung outward or forward horizontal disposition about the fold lines 34b to define flaps or tabs 33b; and, the circular cuts 32b have been severed to form through openings or apertures 35b in the tabs 33b. Further, the lower portions of panel regions 29 have been swung forward or upward about their fold lines 40 to extend horizontally, forward therefrom and define additional flaps or tabs 42 located in spaced facing relation with and below respective flaps 33b. The circular cuts 41 have been severed to form through openings or apertures 43 in the flaps 42, which apertures are in substantial vertical alignment with the apertures 35b of flaps 33b. The lower flap apertures 43b may be of larger size than the upper flap apertures 35b, for purposes appearing presently.

It may be observed in FIG. 11 that the divider panel 42b is associated with a pair of bottles 36b, with the neck of each bottle extending through a respective pair of aligned flap apertures 43 and 35b. Further, the larger size of the lower flap aperture 43 enables the lower flap to seat on the enlarged or shoulder portion of its respective bottle, while the upper neck portion is received in the upper flap aperture 35b, to effectively maintain the panel 24b in an upstanding condition for prominently displaying its advertising material.

Figure 12:
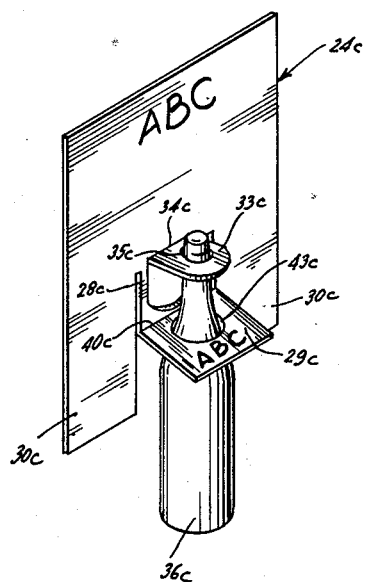
FIG. 12 is a perspective view illustrating the slightly modified embodiment of FIG. 9 as an easel in its display condition.

FIGS. 9 and 12 show a divider panel 24c which is substantially the same as the panel 24b of FIGS. 8 and 11, except that there are only two slots 28c, instead of three slots 28b, and therefore only a single panel region 29c instead of a pair of panel regions 29b. The divider panel 24c is illustrated in inverted condition, as being indicative of its condition in the cell structure 21b of FIG. 6. Thus, as seen in such figure, the panel 24c may, if desirable, be in interfitting relationship with the panel 24b in the cell structure.

The single region 29c of divider panel 24c may be formed with a U-shaped cut or weakened line 31c, corresponding to the cuts 31b, a circular cut or weakened line 32c, corresponding to the cut 32b, a fold line or crease 40c, corresponding to the fold line or crease 40, and an additional circular cut or weakened line 41c corresponding to the cut 41.

In FIG. 12 is illustrated the condition of panel 24c with the circular cuts 32c and 41c severed to define apertures 35c and 43c, respectively. Also, the cut 31c has been severed to permit forward swinging movement of the flap 33c about the fold line 34c. The portion of region 29c between the fold line 40c and the panel edge 25c (the upper panel edge in FIG. 9) has been swung forward about the fold line, and a bottle 36c engaged in the aligned apertures 43c and 35c.

Of course, similar structures may be provided in the outer regions 30b and 30c of FIGS. 8 and 9 either in addition to or in place of the structures provided in the inner regions 29b and 29c.

Another slightly modified divider panel 24d is shown in the cell structure 21b of FIG. 6, and illustrated in greater detail in FIGS. 7 and 10.

The divider panel 24d is shown in FIG. 7 as being of generally rectangular, coplanar configuration, having horizontal edges 25d and 26d, the former being upper and the latter lower as illustrated, and generally vertical side edges 27d extending between the horizontal edges. A pair of slots 28d extend in parallelism inward or downward from the edge 25d, terminating short of or spaced from the opposite edge 26d to define a plurality of equal-area regions 29d and 30d, the former lying between the slots 28d and the latter between each of the side edges 27d and the adjacent slot 28d.

A fold line, perforated line, or score 45 is formed in the panel 24d extending laterally or horizontally between the side edges 27d and intersecting with the slots 28d. The fold line or score 45 is located adjacent to the inner ends of the slots 28d. Between the fold line or score 45 and the panel edge 25d, there may extend a pair of closely adjacent, horizontally extending fold lines or scores 46. This pair of fold lines 46 extends laterally or horizontally between the panel side edges 27d, and is spaced intermediate the fold line 45 and panel edge 25d. Formed in each of the panel regions 29d and 30d, between the panel edge 25d and the fold lines 46 is a circular cut or weakened line 41d. Similarly a circular cut or weakened line 47 may be formed in panel 24d in line with each of the cuts 41d but of smaller diameter; and, an additional circular cut or weakened line 48 may be formed in the panel 24d between each of the cuts 47 and the panel edge 26d.

The panel regions bounded within the circular cuts 41d, 47, and 48 may all be readily removed by severance of said cuts to respectively define apertures 43d, 50, and 51. The portions of panel regions 29d and 30 between the panel edge 25d and scores or fold lines 46 are foldable along the latter, and also along the fold line 45 to swing these portions into facing, underlying relation with respect to the remainder of the panel, and specifically to respectively vertically align each aperture 43d with a respectively aperture 50, see FIG. 10. In this condition, it is seen that the panel regions between the fold lines 46 and 45 define generally upstanding portions advantageously adapted for displaying advertising material. Further, the remainder of the panel 24d, say between the fold line 45 and edge 26d may provide a platform for supporting additional merchandise or the like.

The panel 24d is associated with a plurality of bottles 36d, each bottle having its neck extending upwardly through a respective aligned pair of apertures 43d and 50, or upwardly through a respective aperture 51. In this manner, the panel 24d provides an attractive and utilitarian platform supported by the merchandise itself, namely the bottles 36d.

Of course, a single cell structure may include one or more of the hereinbefore described embodiments, as desired.

Also in the embodiment of FIGS. 2 and 4, the opposite face of panel 24a may be provided with the desired advertising message, and portions of the bottle 36a exposed on the opposite side of the panel through the panel openings formed by outward swinging of the flaps 33a.

Figure 13:
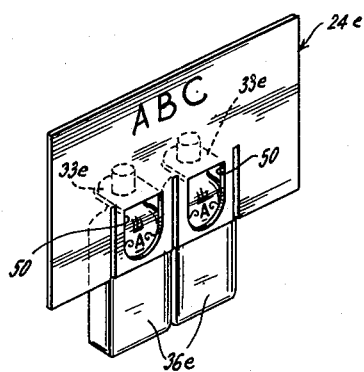
FIG. 13 is a perspective view showing a further embodiment of a divider panel as an easel in merchandise-displaying condition.

In FIG. 13 is shown another slightly modified embodiment, which was mentioned hereinbefore, and wherein a divider panel 24e is formed with a pair of flaps 33e shown in their position swung out of the plane of the panel to extend generally normal to the panel. In this embodiment, the flaps 33e are swung rearward out of the plane of the panel 24e, and leave panel openings 50 in the regions from which the flaps were formed. The bottles 36e are located on the rearward side of the panel 24e with their necks extending upward through the flaps 33e to support the panel in its upstanding, easel-forming displaying condition for visual presentation of the advertising indicia. Also, the neck portions of the bottles or the bottle labels are attractively visually presented through and framed within the panel openings 50, say to display a trademark or the like.

Figure 14:
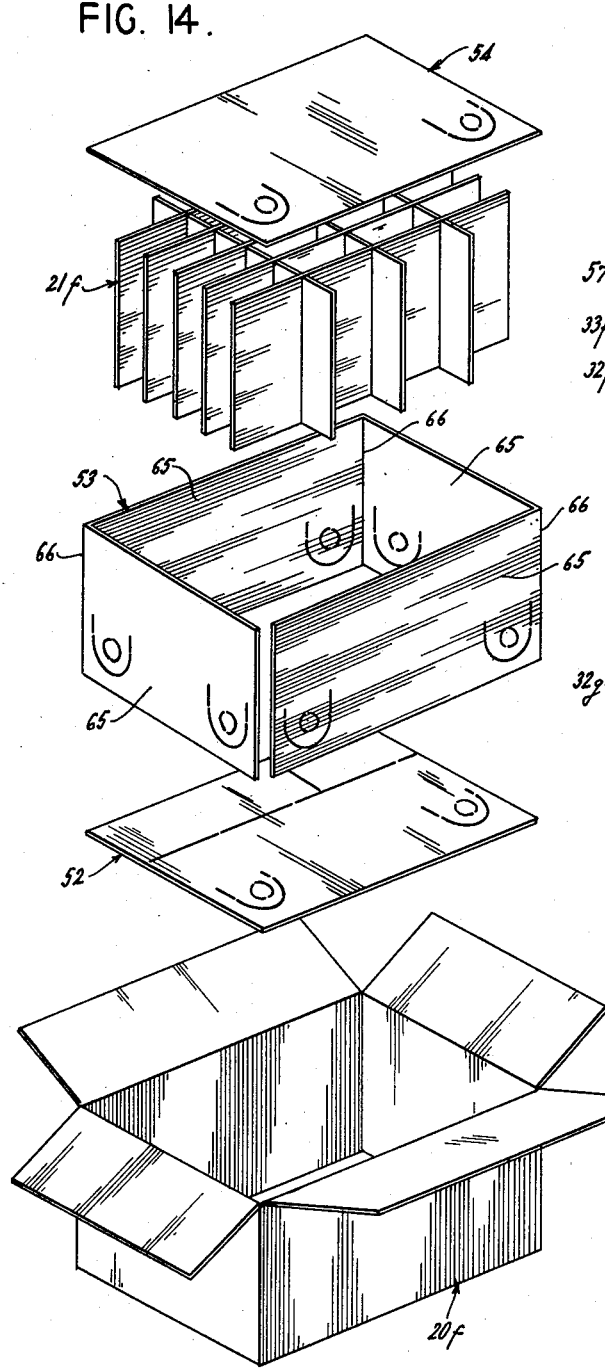
FIG. 14 is an exploded perspective view of another slightly modified embodiment of the present invention illustrating various parts of a shipping container.

FIG. 14 illustrates the several component parts of a combination shipping container and display device of the present invention, namely a carton or container 20f, a bottom protecting pad 52 adapted to rest on the bottom wall of and within the container, a liner 53 adapted to extend interiorly about the side walls of the container, a cell structure 21f adapted to be received in the container encompassed by the liner, and a top protecting pad 54 adapted to overlie the cell structure within the container.

Figure 15:
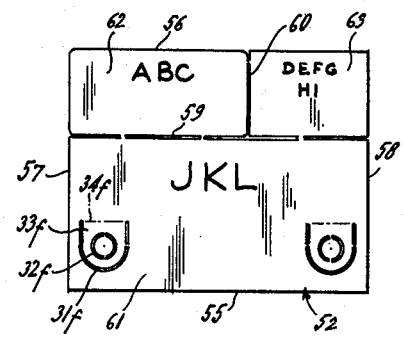
FIG. 15 is a plan view showing a protecting pad of the container of FIG. 14.

The bottom protecting pad 52 is shown in detail in FIG. 15 and is a generally rectangular sheet having lower and upper edges 55 and 56, and side edges 57 and 58 extending between the lower and upper edges. An interrupted cut or line of weakening 59 extends parallel to the lower and upper edges 55 and 56 terminating at its opposite ends at the side edges 57 and 58; and, an additional interrupted cut or line of weakening 60 extends generally parallel to the side edges 57 and 58 between the cut 59 and upper edge 56. Thus, the lower pad or panel 52 is subdivided into three separable regions or sections of generally rectangular configuration, the largest being designated 61, and the remaining sections being designated 62 and 63. The various letters applied to these sections, of course, indicate the provision thereon of suitable advertising matter. The smaller sections 62 and 63 are separable from the remaining section 61, and from each other for use as advertising signs or cards. The larger section 61 is provided with a pair of laterally spaced, generally U-shaped weakened portions or interrupted cuts 31f, each having a laterally disposed fold line 34f extending between its ends. Thus, the cuts 31f are severable and combine with the fold lines 34f to define flaps 33f swingable from the plane of the panel section 61 to a position generally normal to the plane of the panel section. Also, the flaps 33f are provided with generally circular, or other closed-configuration interrupted cuts 32f severable to define apertures in the respective flaps.

Figure 17:
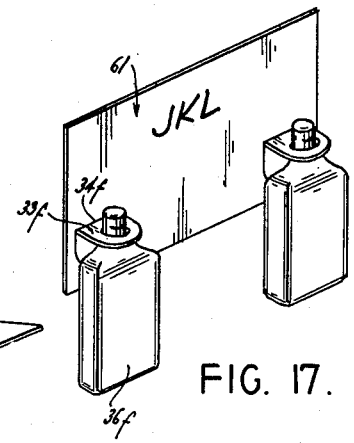
FIG. 17 is a perspective view showing a part of the pad of FIG. 15 in display condition associated with the goods for presenting an advertising message related to the goods.

The easel-forming, displaying condition of the panel section 61 is shown in FIG. 17, wherein the flaps 33f are swung forward, and bottles 36f arranged with their necks extending upward through the apertures in the respective flaps to support the panel section in an elevated display condition. Here again, the arrangement may be reversed by providing advertising matter on the opposite face of the panel section 61, and exposing the bottles through the panel openings formed by swinging movement of the flaps 33f.

The top protecting pad 54 may be substantially identical to the bottom protecting pad 52, except that it is not provided with interrupted cuts or weakened lines 59 and 60, so that it is of greater size in its easel-forming, display condition.

Figure 16:
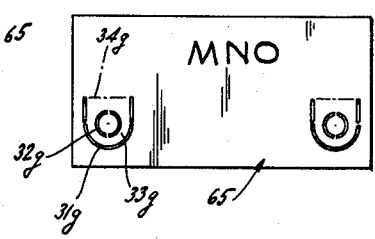
FIG. 16 is a plan view showing a section of the container liner of FIG 14.

The liner 53 includes a plurality of generally rectangular sections or panels 65 arranged in end-to-end relation and hingedly connected together, as by scores interrupted cuts or fold lines 66, along which it may be severed to provide four separate panels. One such panel is shown in FIG. 16, and is provided with a pair of laterally spaced, generally U-shaped interrupted cuts or weakened lines 31g, and a fold line or score 34g extending laterally between the ends of each interrupted cut. Within the region bounded by each cut 31g and fold line 34g is formed a circular or other closed-configuration interrupted cut 32g, adapted for removal to form apertures. Thus, the regions 33g are swingable in the same maner as corresponding regions described hereinbefore to form flaps, for mounting the panel 65 on a supporting bottle or bottles.

It is, of course, appreciated that the various structures described hereinbefore are capable of wide variety in size and shape, as for use with different-sized shipping containers and containers of goods.

From the foregoing, it is seen that the present invention provides a structure for a combination shipping container and merchandise display device which fully accomplishes its intended objects, and is well adapted to meet practical conditions of manufacture and use.

Although the present invention has been described in some detail by way of illustration and example for purposes of clarity of understanding, it is understood that certain changes and modifications may be made within the spirit of the invention and scope of the appended claims.

What is claimed is:

1. A combination divider for a container and theft-proof display comprising a generally rectangular panel having a plurality of slots extending inward from one edge and terminating short of the opposite edge, said panel being formed with a fold line extending generally parallel to and spaced from said one edge intersecting with said slots and terminating at the remaining edges of said panel, said fold line combining with said slots to define of the panel portions between said one edge and fold line a plurality of flaps located between adjacent pairs of said slots and said slots and said remaining panel edges, each of said flaps being formed with a portion having an opening adapted to receive the neck of a bottle, said panel being formed with additional openings located in the plane of said panel and positioned to be in substantial alignment with the openings in said flap portions when said portion is swung into facing relation with said panel and separated therefrom by a predetermined distance, said panel openings being of a size adapted to receive the neck of a bottle, whereby each of said panel and the respective flap openings is adapted to simultaneously receive the neck of the same upstanding bottle with said panel overlying said portions to define a platform mounted on said bottle and the panel region between said flap portions and fold line provides a generally upstanding display portion when said panel is in its platform defining condition.

2. A combination divider for a container and theft-proof display comprising a generally rectangular panel having a plurality of slots extending inward from one edge and terminating short of the opposite edge, said panel being formed with a fold line extending generally parallel to and spaced from said one edge intersecting with said slots and terminating at the remaining edges of said panel, said fold line combining with said slots to define of the panel portions between said one edge and fold line a plurality of flaps located between adjacent pairs of said slots and said slots and said remaining panel edges, each of said flaps being formed with an opening adapted to receive a bottle neck, a first plurality of openings formed in said panel and located in the plane of said panel in one to one correspondence with the openings formed in said flaps and each located in substantial alignment with a respective one of said flap openings when the flaps are swung into generally facing relation with the panel, a second plurality of openings formed in said panel in one to one correspondence with said first plurality of panel openings and each in alignment with respective ones of said first plurality of panel openings, whereby said panel is adapted to be mounted on a plurality of bottles with said flaps swung out of the plane of said panel and the necks of said bottles being received through said flap openings and the respective ones of the first plurality of panel openings and said second plurality of openings receiving the necks of other bottles so said panel lies in a generally horizontal position to define a platform mounted on the bottles.

3. In combination, a plurality of bottles for display, and a combination divider for a container and theft-proof display comprising a generally rectangular panel having a plurality of parallel slots extending inward from one edge and terminating substantially short of the opposite edge, said panel being formed with a double creased fold line extending generally parallel to and spaced from said one edge intersecting with said slots and terminating at the remaining pair of edges of said panel, said double creased fold line combining with said slots to define of the panel portions between said one edge and fold line a plurality of flaps between adjacent pairs of said slots and said slots and said remaining panel edges, each of said flaps being formed with an opening receiving the neck of a different one of said plurality of bottles, said panel being formed with a second single creased fold line extending generally parallel to and spaced from said double creased fold line intersecting with said slots and terminating at the edges of said panel and spaced between said first double creased fold line and said opposite edge of said panel so that a portion of said flap between said double creased fold and said single creased fold may be positioned perpendicularly to the plane of said panel and said portion of said flap having openings, and said panel being formed with additional openings each located in substantial alignment with the respective one of said flap openings when the flaps are swung into generally facing relation with the panel, said additional openings receiving the neck of said bottles with said panel in generally horizontal condition to define a platform mounted on said bottles.

References Cited in the file of this patent

UNITED STATES PATENTS

| | | |
|---|---|---|
| 1,551,139 | Dietsche | Aug. 25, 1925 |
| 1,822,007 | Cable | Sept. 8, 1931 |
| 1,896,678 | Myers | Feb. 7, 1933 |
| 1,982,640 | Clark | Dec. 4, 1934 |
| 2,126,461 | Graham | Aug. 9, 1938 |
| 2,252,235 | Snelling | Aug. 12, 1941 |
| 2,340,719 | Walter | Feb. 1, 1944 |
| 2,737,326 | Toensmeier | Mar. 6, 1956 |
| 2,944,665 | Obeck | July 12, 1960 |

FOREIGN PATENTS

| | | |
|---|---|---|
| 714,467 | Great Britain | Aug. 25, 1954 |